June 5, 1962   J. A. DEVINE ETAL   3,038,046
COMBINED CUTOUT AND LIGHTNING ARRESTER BRACKET ASSEMBLY
Filed May 18, 1960   3 Sheets-Sheet 1

JOSEPH A. DEVINE
WALTER TABOWSKY
INVENTORS.

BY

ATTORNEY

June 5, 1962 J. A. DEVINE ETAL 3,038,046
COMBINED CUTOUT AND LIGHTNING ARRESTER BRACKET ASSEMBLY
Filed May 18, 1960 3 Sheets-Sheet 2
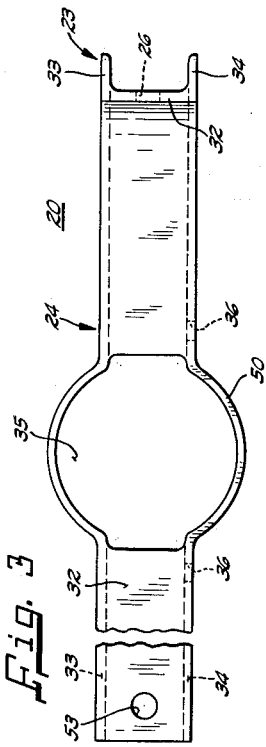
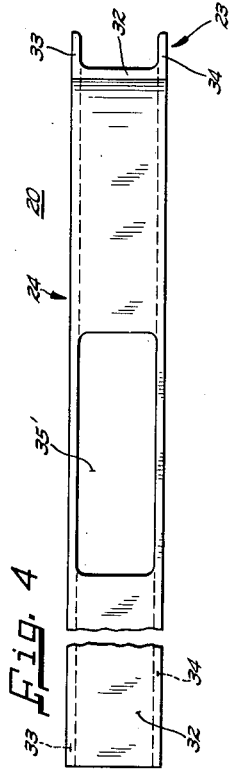
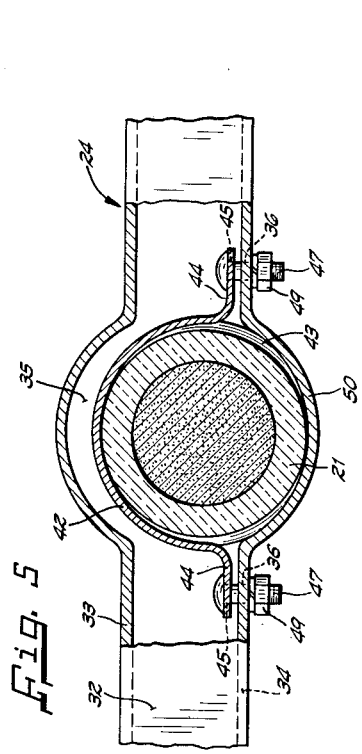
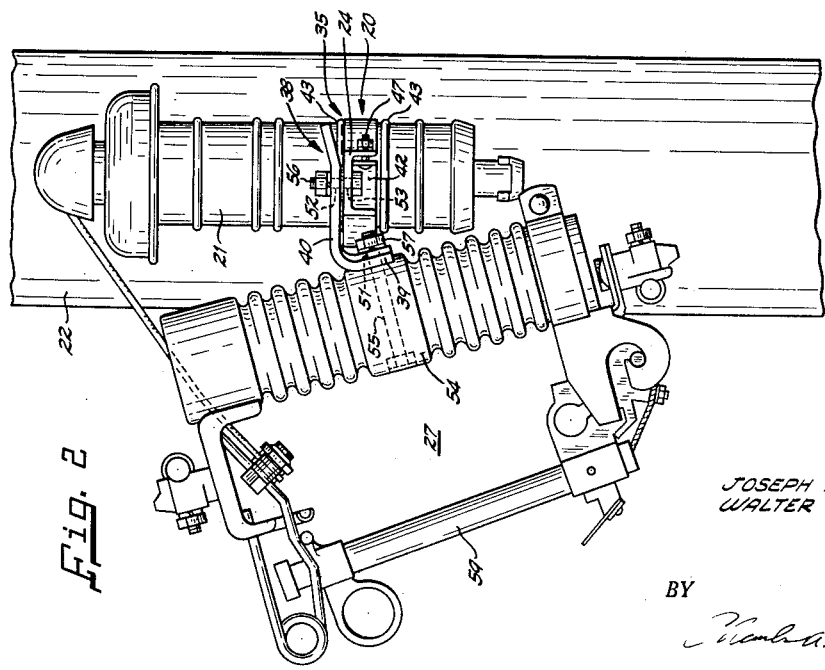
JOSEPH A. DEVINE
WALTER TABOWSKY
INVENTORS.
BY
ATTORNEY

United States Patent Office 3,038,046
Patented June 5, 1962

3,038,046
COMBINED CUTOUT AND LIGHTNING
ARRESTER BRACKET ASSEMBLY
Joseph A. Devine and Walter Tabowsky, Scarborough, Ontario, Canada, assignors to McGraw-Edison Company, Milwaukee, Wis., a corporation of Delaware
Filed May 18, 1960, Ser. No. 29,907
11 Claims. (Cl. 200—114)

This invention relates to support members for electrical apparatus and, more particularly, to a bracket assembly for supporting electrical protective equipment.

Electrical equipment such as a distribution transformer is often subjected to severe lightning disturbances. Lightning arresters are commonly utilized to minimize breakdown of the transformer insulation from lightning surges. A distribution transformer is generally connected to the power system through a protective link such as fuse cutout. The main purpose of which is to disconnect the transformer from the power system in the event it becomes permanently shorted so that the power system will not be short circuited through the transformer.

Conventionally the practice has been to separately mount the fuse cutout and lightning arrester on the pole that supports the transformer. This construction has proven expensive, and it is time consuming to provide the individual attachment between lightning arrester and pole and fuse cutout and pole. This construction also clutters up the pole, thereby increasing the danger of a lineman coming into contact with an electrically live member on the pole.

Attempts have been made to provide a common support member for the fuse cutout and lightning arrester, but such prior art support members were generally cumbersome, expensive, and of such construction that it was difficult to remove either the cutout or the arrester without disturbing the other piece of equipment. In certain prior art apparatus the common support member was integral with one of the protective devices, thus necessitating the removal of both devices when it was desired to replace the one. Other prior art support members had a tendency to pivot around the pole members in the absence of intricate and costly restraining members.

It is an object of the invention to provide an improved bracket for supporting a plurality of electrical protective devices which permits the asembly of bracket and devices to be shipped and installed as a unit.

It is further object of the invention to provide an improved bracket of simple construction that may be easily affixed to a supporting structure and which is adapted to support a plurality of electrical protective devices in such a position that the effect of the forces resulting from operation of these devices tending to detach the bracket from the pole is minimized.

It is another object of the invention to provide a supporting bracket for a plurality of electrical protective devices which allows the protective devices to be individually detached without the necessity of disturbing all the attached equipment.

It is still further object to provide a combined cutout lightning arrester, and bracket assembly which is less subject to rotation about the support member than prior art constructions.

These and other objects and advantages of the invention will be more readily apparent from the following detailed description taken in conjunction with the accompanying drawing wherein:

FIG. 2 is a view in end elevation of the embodiment of FIG. 1 taken on lines 2—2 of FIG. 1;

FIG. 3 is a plan view of the bracket utilized in the embodiment of FIG. 1 with the protective equipment and attaching means removed;

FIG. 4 is a plan view of the bracket of FIG. 3 prior to the forming operation; and FIG. 5 is a fragmentary view of the bracket showing a section of a protective device supported thereby taken along lines 5—5 of FIG. 1;

Figure 1:
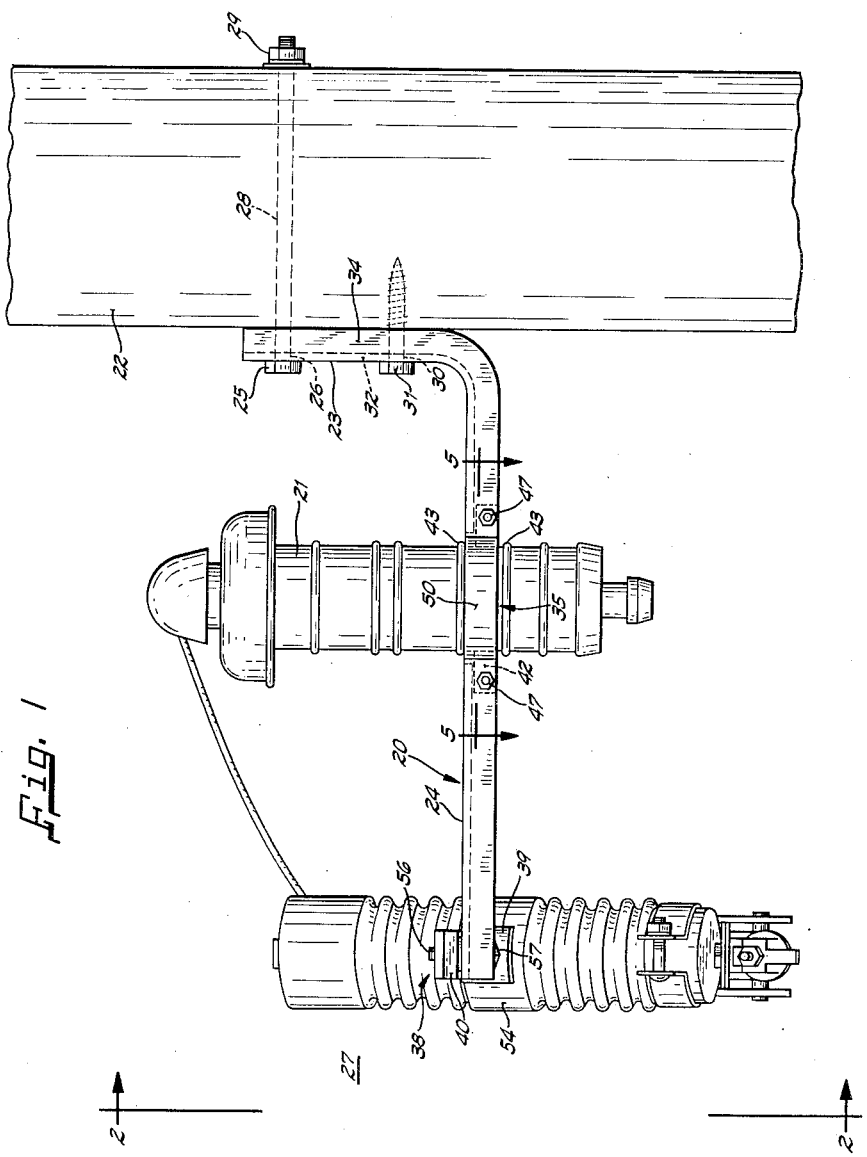
FIG. 1 is a view in side elevation of a preferred embodiment of the invention showing an assembly of bracket with a lightning arrester and fuse cutout.

Referring now to FIG. 1, a bracket 20 is shown supporting a lightning arrester 21 and fuse cutout 27 and mounted on a power pole 22. The bracket 20 comprises leg portions 23 and 24 and is channel shaped in cross-section. The leg portions 23 and 24 of the bracket 20 are, preferably, at right angles to one another although deviations from this angle are possible without destroying the advantages of the invention. The portion 23 of the bracket 20 is affixed to pole 22 by means of a threaded bolt 25 or other holding means (not shown) which extends through apertures 26 and 28 in the bracket 20 and in the pole 22 respectively. A nut 29 engages the threaded end of bolt 25, thereby providing a rigid connection between bracket 20 and pole 22. It is to be understood that the bracket 20 may also be mounted on a distribution transformer or similar electrical apparatus. A lag screw 31 may be provided which extends through aperture 30 in leg 23 and into pole 22. The lag screw provides additional support between the bracket and pole member, although it is not absolutely necessary for satisfactory performance.

As best shown in FIG. 3, the channel bracket 20 has a web 32 and two flanges 33 and 34 at substantially right angles to, and on opposite sides of, the web 32. The flanges 33 and 34 of the leg 23 abut against the pole and prevent rotation of the bracket 20 around the axis of the pole 22 since once the bracket is firmly affixed to the pole by means of nut 29 and bolt 25, the flanges 33 and 34 of the bracket dig into pole 22 to such an extent that lateral movement of the bracket is substantially prevented. Even if the flanges 33 and 34 do not dig into pole 22 to an appreciable extent, substantial resistance to rotation is provided as the flanges 33 and 34 roughly conform to the periphery of the pole 22. In either case the bracket 20 resists heavy wind loadings against the protective devices supported thereby while remaining firmly attached to the support member.

The leg 24 of the bracket 20 is preferably longer than the leg 23, and an aperture 35 is provided through the web portion 32 of leg 24 and is of such size that a lightning arrester 21 may be received therein. The lightning arrester 21 is shown as being of the valve type with axially spaced apart circumferential skirts 43 but may be either a valve or expulsion type arrester, the bracket functioning equally well in supporting one or the other. On either side of the aperture 35 are smaller apertures 36 which extend through the flange 34. An arcuate strap member 42 (FIG. 5) having flattened end portions 44 is received between axially spaced skirts 43 and extends around a portion of the periphery of the arrester 21. Apertures 45 are provided in end portions 44 of the strap member 42 and are in substantially axial alignment with apertures 36 in the flange 34 when the strap 42 is in position around the arrester. Threaded bolts 47 or other means (not shown) extend through the apertures 36 in the flange 34 and through apertures 45 in the strap 42, and nuts 49 are threaded onto the bolts 47 to draw the strap 42 into clamping engagement with the arrester 21. Thusly tightening of the nuts 49 and bolts 47 biases strap 42 toward one side of the aperture 35 in leg 24. Since strap 42 bears upon the lightning arrester 21 it serves to firmly and securely position the arrester 21 within the opening defined by the strap member 42 and a flared-out curvate portion 50 of flange 34. Note that a skirt portion 43 of the arrester 21 overlaps a portion of the strap 42 and curvate portion 50 when the arrester is properly positioned. Removal of the arrester 21 from the bracket 20 is accomplished by loosening nuts 49 on bolts 47 to enable the strap member 42 to be moved outwardly from flange 34, thusly enabling the arrester 21 to be withdrawn from the aperture 35 in the channel member.

The means by which fuse cutout 27 is affixed to leg 24 of channel member 20 is best shown in FIGURE 2 and comprises an L-shaped member 38 which may have some flexibility and which has angularly disposed leg portions 39 and 40. Leg 39 is preferably shorter than leg 40 and has an aperture 51 therein. The leg 40 also has an aperture 52 therethrough. The web 32 of the channel member 20 has an aperture 53 therethrough near that end further removed from the support member 22. The insulator 54 of the fuse cutout 27 has an aperture 55 extending therethrough. The L-shaped member 38 is preferably detachably mounted on the channel member 20 by suitable fastening means such as bolt 56 extending through aperture 52 and the aperture 53 in the channel member 20. Fuse cutout 27 is preferably detachably mounted on L-shaped member 38 by fastening means such as bolt 57 extending through the aperture 51 in the L-shaped member 38 and aperture 55 in the insulator 54 of the cutout. Note that when the fuse cutout 27 is firmly affixed to the bracket 20, it is inclined at an angle to the vertical. This angular positioning of the fuse cutout 27 allows an operator to manually operate the cutout without danger of hot gases generated in the fuse tube blowing in his face.

With a vertically mounted fuse cutout, the forces resulting from rupturing the fuse link act directly to pull the mounting bracket from the pole. The inclination of fuse cutout 27 to the vertical reduces the forces tending to wrench the bracket from pole 22. Further, any component of the recoil force due to rupturing of the fuse within fuse tube 59 tending to rotate bracket around the axis of pole 22 is resisted by the flanges 33 and 34 of the channel member engaging spaced apart peripheral portions of the pole 22. Member 38 which may be somewhat resilient also serves to absorb a portion of the recoil forces tending to wrench the bracket 20 from pole 22.

The bracket 20 may be constructed from a channel member which is bent into substantially L-shape. A channel member is preferred since it will withstand relatively high bending stresses. A rectangular hole 35' (FIG. 4) is stamped in the web portion 32 of the channel member. The rectangular hole 35' may be transformed into the circular hole 35 by a suitable forming die (not shown). This method of enlarging the hole 35' enables a larger circular aperture to be achieved for a given size channel member than would otherwise be possible, thusly permitting the use of a smaller bracket to support the lightning arrester than has heretofore been possible.

The lightning arrester 21 may be inserted through the aperture 35 in the bracket 20 and strap 42 positioned around a portion of the arrester and affixed to the bracket, thusly insuring a rigid connection between arrester and bracket. The member 38 may then be detachably affixed to the bracket 20 and cutout 27 by bolt means 56 and 57 respectively to provide relative rigidity between bracket and cutout. The assembly of bracket, arrester, and cutout may then be crated and shipped as a unit. All that need be done to put the assembly in service is to bolt the bracket to a support member and to make the necessary electrical connections.

If the lightning arrester 21 becomes damaged in service and needs to be replaced, it may be easily detached from the bracket 20 by loosening the fastening means 49. On the other hand, if the cutout 27 is in need of replacement, fastening means 56 or 57 may be loosened, thereby detaching the cutout from the bracket 20. In either case there is no necessity of detaching the bracket from the pole or of detaching the serviceable protective device from the bracket.

Figure 6:
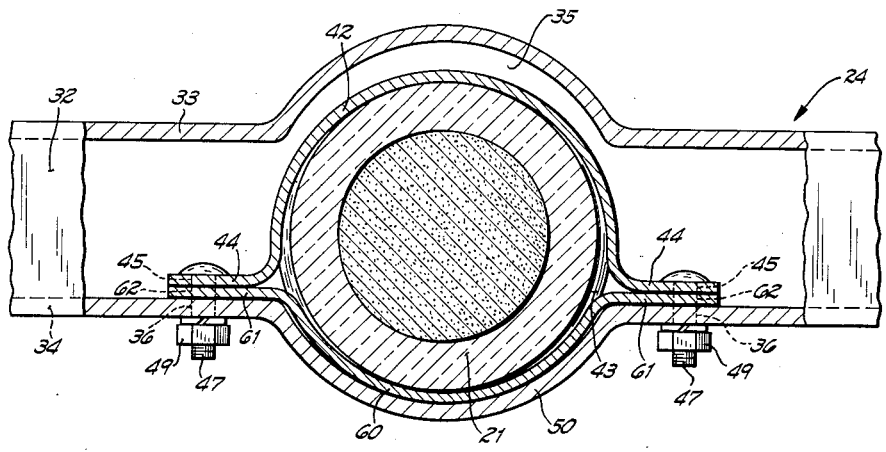
FIG. 6 is a fragmentary plan view of a slightly modified bracket assembly showing a section of a protective device supported thereby.

Referring now to FIG. 6 an alternate embodiment of the bracket assembly of FIGS. 1–5 is shown which possesses all the attributes of the foregoing embodiment but which differs from same in that an additional curvate strap 60 is utilized to mount the lightning arrester 21 in the aperture 35. The curvate strap means 60 has flattened end portions 61 with apertures 62 therethrough which register with apertures 36 in the flange 34 when the strap 60 is properly positioned around the arrester 21. The strap 60 is affixed to the flange 34 by nuts and bolts 47 and 49 respectively which also affix the ends 44 of strap 42 to the flange.

Straps 42 and 60 embrace opposite sides of the lightning arrester 21 thereby clamping the arrester therein between. The skirt portion 43 of arrester 21 may overlap a portion of each of the straps 42 and 60 (as in FIG. 1) when the arrester is properly positioned. Removal of the arrester 21 from the bracket 20 is accomplished by loosening nuts 49 on bolts 47 to enable the strap member 42 to be moved in a direction away from strap member 60, thereby allowing the arrester 21 to be easily moved out of engagement with the strap members 42 and 60.

The addition of strap 60 in the embodiment of FIG. 6 reduces the tendency of the arrester body to be mechanically over stressed due to irregularities that may be present in the curvate portion 50 of the flange 34 since the arrester is primarily supported by the clamping action of straps 42 and 60.

It is noteworthy that additional arrester support may be provided by allowing a portion of the arrester skirt 43 to bear upon the upper margin of the curvate portion 50 of the flange 34 but this is not shown. Even in the case where portions of skirt 43 overlie portions of member 50 only straps 42 and 60 actually embrace the arrester in a clamping or grasping manner.

It is evident from the above description of my invention that the disclosed cutout, arrester, and bracket assembly possesses high mechanical strength, is easily installed, and permits removal of either cutout or arrester from the bracket without the necessity of removing both.

While only two particular embodiments of the invention have been shown and described, it will be obvious to those skilled in the art that various changes and modifications can be made therefrom without departing from the invention and, therefore, it is intended in the appended claims to cover all such changes and modifications as fall within the true spirit and scope of the invention.

We claim:

1. Means for mounting first and second electrical protective devices on a support member, comprising, in combination, a channel member having first and second portions angularly disposed relative to one another, said first portion being constructed and arranged to be rigidly affixed to said support member, said second portion of said channel member having an aperture in the web thereof for receiving said first protective device, first detachable means for rigidly securing said first device in said aperture, second detachable means for attaching said second protective device to said second portion of said channel member in spaced relation to said first device, said means for attaching said first and second protective devices to said channel member being individually releasable so that said first and second protective devices may be removed from said channel member independent of each other.

2. Support means for mounting first and second overvoltage protective devices on a support member comprising, in combination, an L-shaped channel member having a pair of relatively angularly disposed legs, one of said legs of said L-shaped channel member being constructed and arranged to be affixed to said support member the other leg of said channel member having an aperture through the web portion thereof and intermediate its ends for receiving said first overvoltage protective device, detachable means embracing a portion of said first protective device and engaging a flange portion of said other leg for clamping said first device thereto, releasable means adjacent the free end of said other leg for attaching said second over-voltage protective device to said other leg, whereby one of said protective devices may be removed from said channel member without disturbing the other of said protective devices.

3. Bracket means for mounting a lightning arrester and a fuse cutout on an upright pole member comprising, in combination, a channel member having first and second portions angularly disposed relative to one another, said first portion of said channel member being constructed and arranged to be rigidly affixed to said pole member, said second portion of said channel member having an aperture therethrough intermediate its ends for receiving said lightning arrester, first detachable means for rigidly securing said lightning arrester in said aperture, second detachable means near the free end of said second portion of said channel member for attaching said fuse cutout thereto, the flanges of said first portion of said channel member being engageable with spaced apart portions of the periphery of said pole member and adapted to bite into said pole member where attached thereto, whereby rotation of said bracket means around the axis of said pole member is prevented.

4. Bracket means for mounting a lightning arrester and fuse cutout on an upright support member comprising, in combination, a channel member having first and second portions angularly disposed relative to one another, said first portion being constructed and arranged so that the open side of said channel member is positioned against said support member to prevent rotation of the channel member around the axis of said support member, said second portion of said channel member having an aperture through the web thereof for receiving a lightning arrester body, said aperture being defined by outwardly flared flange portions of said channel member and being of greater diameter than said web, first detachable means for mounting said lightning arrester between said outwardly flared flange portions, and second detachable means adjacent the free end of said second portion for fixedly attaching said fuse cutout to said channel member so that the axis of said fuse cutout is inclined to the vertical, whereby said lightning arrester and said fuse cutout are independently detachable from said bracket means.

5. Bracket means for mounting a lightning arrester and a fuse cutout on a support member comprising, in combination, an L-shaped channel member, the shorter leg of said L-shaped channel member being constructed and arranged so that the open side of said channel member is positioned against said support member to prevent rotation of the channel member in a direction around the axis of said support member, said other leg of said channel member having a portion of the web removed and outwardly flared flanges on opposite sides of said removed portion defining an aperture intermediate the ends of said other leg for receiving a lightning arrester body, means for releasably attaching said lightning arrester to said channel member within said aperture including an arcuate restraining strap disposed radially inward of said outwardly flared flanges and surrounding a portion of said lightning arrester and engaging said channel member, detachable means adjacent the free end of said channel member for attaching said fuse cutout to said channel member so that the axis of said fuse cutout is inclined to the vertical, said fuse cutout and said lightning arrester being independently mounted on, and detachable from, said channel member.

6. Bracket means for mounting a lightning arrester and a fuse cutout on a support member comprising, in combination, an L-shaped channel member, the shorter leg of said L-shaped member being constructed and arranged so that the open side of said channel member is positioned against said support member to prevent rotation of the channel member around the axis of said support member, the longer leg of said channel member having an opening through the web thereof and flared out flanged portions disposed on opposite sides of said opening defining an aperture intermediate the ends of said longer leg for receiving said lightning arrester, the diameter of said aperture being greater than the width of said channel member, means including a restraining strap embracing a portion of said lightning arrester for releasably mounting said lightning arrester within said aperture, detachable means adjacent the free end of said channel member for attaching said fuse cutout to said channel member, said detachable means being somewhat resilient and constructed and arranged to absorb a portion of the recoil forces incident to operation of said fuse cutout, thereby diminishing the tendency of said recoil forces to wrench said channel member from said support member.

7. A mounting bracket comprising an L-shaped channel member, one of the legs of said L-shaped channel member being constructed and arranged to be affixed to a support member so that the flanges of said channel member contact the support member, opposed flanges of the other of the legs of said channel member being flared outwardly intermediate the ends of said leg and the portion of the web of said channel member between said opposed flanges being removed to define a substantially circular aperture of a diameter in excess of the width of said channel member, at least one of the flanges of said other leg having a pair of apertures spaced apart and on opposite sides of said aperture.

8. In combination, a lightning arrester, a fuse cutout, an L-shaped bracket of channel cross-section, opposed portions of the flanges of one of the legs of said L-shaped bracket being outwardly curved intermediate the ends of said one leg and the portion of the web between said opposed portions being removed to define an approximately circular aperture having a diameter greater than the width of the web of said channel cross section, and lightning arrester having a cylindrical body portion disposed in said aperture, curvature strap means for embracing a portion of the periphery of said cylindrical body portion, detachable fastening means engaging the ends of said strap means and also engaging spaced apart portions of one of said flanges on opposite sides of said aperture for urging said strap means into clamping engagement with said lightning arrester, and detachable means engaging the free end of said one leg for mounting a fuse cutout thereon.

9. In combination, a lightning arrester, a fuse cutout, an L-shaped bracket of channel cross-section, opposed portions of the flanges of one of the legs of said L-shaped bracket being outwardly curved intermediate the ends of said one leg and the portion of the web between said opposed portion being removed to define an approximately circular aperture having a diameter greater than the width of the web of said channel cross-section bracket, said lightning arrester having a cylindrical body portion disposed in said aperture, first detachable means including a strap embracing a portion of the periphery of said cylindrical body portion for mounting said lightning arrester within said curved flange portions, and second detachable means spaced apart from said first means for affixing said fuse cutout to said one leg whereby said lightning arrester and said fuse cutout may be individually detached from said bracket.

10. In combination, a lightning arrester, a fuse cutout, an L-shaped bracket of channel cross-section, opposed portions of the flanges of one of the legs of said L-shaped bracket being outwardly curved intermediate the ends of said one leg and the portion of the web between said opposed portions being removed to define an approximately circular aperture having a diameter greater than the width of the web of said channel cross-section, said lightning arrester having a cylindrical body portion and axially spaced apart circumferential skirts, and being disposed in said aperture, curvate strap means for embracing a portion of the periphery of said cylindrical body portion between adjacent circumferential skirts, detachable fastening means engaging the ends of said strap means and also engaging spaced apart portions of one of said flanges on opposite sides of said aperture for urging said strap means toward one of said outwardly curved flange portions to clamp said lightning arrester to said one leg, whereby one of said circumferential skirts overlies portions of said one outwardly curved flange portion and said strap means, and detachable recoil-absorbing means spaced apart from said aperture for affixing said fuse cutout to said one leg.

11. In combination, a lightning arrester, a fuse cutout, an L-shaped bracket of channel cross-section, opposed portions of the flanges of one of the legs of said L-shaped bracket being outwardly curved intermediate the ends of said one leg and the portion of the web between said opposed portions being removed to define an approximately circular aperture having a diameter greater than the width of the web of said channel cross-section, said lightning arrester having a cylindrical body portion and axially spaced apart circumferential skirts, and being disposed in said aperture, first and second curvate strap means for embracing opposed portions of the periphery of said cylindrical body portion, detachable fastening means engaging the ends of said strap means and also engaging spaced apart portions of one of said flanges on opposite sides of said aperture for urging said first and second strap means into clamping engagement with said lightning arrester, and detachable recoil absorbing means engaging the free end of said one leg for mounting a fuse cutout thereon.

References Cited in the file of this patent

UNITED STATES PATENTS

| | | |
|---|---|---|
| Re. 23,293 | Earle | Nov. 14, 1950 |
| 2,003,298 | Lemmon | June 4, 1935 |
| 2,203,349 | Fox | June 4, 1940 |
| 2,721,219 | Giese et al. | Oct. 25, 1955 |

UNITED STATES PATENT OFFICE
CERTIFICATE OF CORRECTION

Patent No. 3,038,046          June 5, 1962

Joseph A. Devine et al.

It is hereby certified that error appears in the above numbered patent requiring correction and that the said Letters Patent should read as corrected below.

Column 6, line 39, for "and" read -- said --; line 41, for "curvature" read -- curvate --.

Signed and sealed this 30th day of October 1962.

(SEAL)
Attest:

ERNEST W. SWIDER
Attesting Officer

DAVID L. LADD
Commissioner of Patents